United States Patent [19]
Fujimura

[11] Patent Number: 5,751,988
[45] Date of Patent: May 12, 1998

[54] MICROCOMPUTER WITH MEMORY BANK CONFIGURATION AND REGISTER BANK CONFIGURATION

[75] Inventor: Sayuri Fujimura, Tokyo, Japan

[73] Assignee: NEC Corporation, Tokyo, Japan

[21] Appl. No.: 705,017

[22] Filed: Aug. 29, 1996

Related U.S. Application Data

[63] Continuation of Ser. No. 720,160, Jun. 25, 1991, abandoned.

[30] Foreign Application Priority Data

Jun. 25, 1990 [JP] Japan ..................... 2-165911

[51] Int. Cl.$^6$ ..................... G06F 12/06
[52] U.S. Cl. ..................... 395/405; 395/421.1
[58] Field of Search ..................... 395/402, 405, 395/421.1

[56] References Cited

U.S. PATENT DOCUMENTS

| | | | |
|---|---|---|---|
| 3,737,860 | 6/1973 | Sporer | 395/425 |
| 4,414,622 | 11/1983 | Matsumoto | 395/400 |
| 4,980,850 | 12/1990 | Morgan | 395/497.03 |
| 5,036,493 | 7/1991 | Nielsen | 365/230.03 |
| 5,093,783 | 3/1992 | Kitada | 395/421.1 |
| 5,206,942 | 4/1993 | Ibi | 395/405 |

FOREIGN PATENT DOCUMENTS 0170284 2/1986 European Pat. Off. .

Primary Examiner—Eddie P. Chan
Assistant Examiner—Reginald G. Bragdon

[57] ABSTRACT

A microcomputer includes a plurality of register banks and a plurality of memory bank select registers coupled to the respective register banks. A register bank select register temporarily stores memory bank selection information. A bank select circuit is coupled to the register bank select register, which circuit decodes the memory bank selection information stored and selects one of the plurality of register banks and also one of the plurality of memory bank select registers. An address generating circuit is provided in the microcomputer for generating a memory address based on contents of the selected one register bank and the selected one memory bank select register, both selected by the bank select circuit. The memory address has the contents of the selected one register bank as lower-order bit contents and the contents of the selected one memory bank select register as higher-order bit contents. The memory bank selection information is saved in the register bank select register when an interruption request is issued and, new memory bank selection information is rewritten in the register bank select register. The bank select circuit responds to the new memory bank selection information and selects another register bank and another memory bank select register according to new selection information.

8 Claims, 4 Drawing Sheets

MICROCOMPUTER WITH MEMORY BANK CONFIGURATION AND REGISTER BANK CONFIGURATION

This is a continuation of application Ser. No. 07/720,160, filed Jun. 25, 1991 now abandoned.

BACKGROUND OF THE INVENTION

The present invention relates to a microcomputer and, more particularly, to a microcomputer having memory banks and register banks.

Conventional microcomputers of the type to which the present invention relates, have a plurality of memory banks, wherein a memory unit has a certain memory capacity to allow expansion of data memory, and a selection of one memory bank out of the plurality of the memory banks is effected by a memory bank select register. Also microcomputers of such type have a plurality of register banks, wherein a plurality of general purpose registers constitute a unit to enhance performance of the register banks during execution of an interruption processing or a subroutine processing, and a selection of a register bank is effected by one register bank select register.

A conventional microcomputer with a register bank select circuit and a conventional memory bank select circuit is shown in FIG. 1. A 4-bit microcomputer is used as an example of the prior art.

FIG. 2 shows an allocation of a conventional data memory. A data memory 18 has a capacity of 1024×4 bits, and comprises four memory banks (memory banks "0" to "3") wherein 256×4 bits form one unit.

The register bank select circuit and the memory bank select circuit of the conventional microcomputer shown in FIG. 1 comprise a register bank (#a) 1, a register bank (#b) 2, a register bank (#c) 3, a register bank (#d) 4, a memory bank select register 17, a register bank select register 9, a bank select circuit 10, a data bus 11, a lower-order address generating circuit 12, a higher-order address generating circuit 13, and a central processing section (not shown). The central processing section sets data in the register bank (#a) 1, register bank (#b) 2, register bank (#c) 3, register bank (#d) 4, memory bank select register 17 and register bank select register 9 through the data bus 11. The register bank select register 9 is a register which selects a register bank to be used. The contents of the register bank select register 9 are decoded in the bank select circuit 10. If the content of the register bank select register 9 is "00", the register bank (#a) 1 is selected: if it is "01", the register bank (#b) 2 is selected, if the content is "10", the register bank (#c) 3 is selected, and if it is "11", the register bank (#d) 4 is selected. The register bank (#a) 1 comprises four 4-bit configuration registers A0, B0, C0, and D0. The register bank (#b) 2 comprises four 4-bit configuration registers A1, B1, C1, and D1. The register bank (#c) 3 comprises four 4-bit configuration registers A2, B2, C2, and D2. The register bank (#d) 4 comprises four 4-bit configuration registers A3, B3, C3, and D3. Each pair of registers A0 and B0, A1 and B1, A2 and B2, and A3 and B3, respectively, forms an indirect addressing register. Each pair of registers C0 and D0, C1 and D1, C2 and D2, and C3 and D3, respectively, also forms an indirect addressing register. The lower-order address generating circuit 12 is an address generating circuit which outputs an address specified by a direct addressing instruction and the contents of the indirect addressing register specified by an indirect addressing instruction as lower-order 8-bits MA7–MA0 of the memory address. The higher-order address generating circuit 13 is an address generating circuit which outputs the contents of the memory bank select register 17 specified by the register bank select register 9 as higher-order 2-bits MA9, MA8 of the memory address. The memory bank select register 17 is a 2-bit register which selects one of the memory banks "0" to "3" to be used according to the contents thereof. A conventional method of the selection of a memory bank and a conventional method of the selection of a register bank when an interruption request is issued in a microcomputer using a conventional bank selection method are as follows:

In the main routine, the register bank (#a) 1 is selected by setting "00" in the register bank select register 9, and processing is performed by setting "00" in the memory bank select register 17 with the memory bank "0" selected as an access memory area. For instance, when the data "06H" and "0CH" are set in the registers A0 and B0 of the register bank (#a) 1, respectively, and an indirect addressing instruction of registers A0 and B0 is executed, the higher-order address generating circuit 13 outputs MA9, MA8=00, while the lower-order address generating circuit 12 outputs MA7–MA0=01101100, to thereby enable access to a memory address "06CH".

Next, the processing when a request for an interruption is issued will be described.

When the processing is switched or branched to an interruption processing routine upon the occurrence of a request for an interruption, the current contents of the register bank select register 9 and also the memory bank select register 17 are stored in a stack area by the execution of a PUSH command. Then, a register bank and a memory bank to be used in the interruption processing routine are selected. Here, the register bank (#b) 2 is selected by setting "01" in the register bank select register 9, and processing is performed by setting "11" in the memory bank select register 17 with the memory bank "3" selected as an access memory area. For instance, if data "06H" and "0CH" are set in registers A1 and B1 of the register bank (#b) 2, respectively, and an indirect addressing instruction of registers A1 and B1 is executed, the higher-order address generating circuit 13 outputs MA9, MA8=11, while the lower-order address generating circuit 12 outputs MA7–MA0=01101100, thus enabling access to the memory address "36CH". At the end of the interruption processing routine, information of the register bank and the memory bank which is to be used in the main routine, which has been stored in the stack area, is restored in accordance with a POP command.

As described above, in the prior art microprocessor, when an interruption processing is to be effected, it is necessary to save two bank-information set in a main routine and set two bank-information for the interruption processing routine, and then to restore the two bank-information set in the main routine at the end of the interruption processing routine.

In short, the memory bank control method and the register bank control method of the prior art are such that, when an interruption as described above is effected, or when data transactions and data comparison between the memory banks are frequently carried out, and when a call instruction is executed, such operations require frequent switchings of the memory banks and register banks. Also, the number of necessary program steps also increases for this purpose, and even if the required steps are grouped into subroutines, when the above-mentioned operations are repeated a number of times in a wide range of addresses, the time required for the data processing substantially increases due to the memory bank switching operations. This has been a disadvantage in the prior art microcomputers of the type under consideration.

SUMMARY OF THE INVENTION

It is, therefore, an object of the present invention to overcome disadvantages of the conventional microcomputer and to provide an improved microcomputer.

Another object of the present invention is to provide a microcomputer in which the number of program steps can be decreased and the time required for data processing can be reduced.

In accordance with one aspect of the invention, there is provided a microcomputer which comprises:

a plurality of register banks, a plurality of memory bank select registers respectively coupled to the register banks; a register bank select register for temporarily storing memory bank selection information; and a bank select circuit, coupled to the register bank select register, for decoding the memory bank selection information stored in the register bank select register and for selecting both one of the plurality of register banks and one of the plurality of memory bank select registers. An address generating circuit is provided for generating, based on contents of the selected one register bank and the selected one memory bank select register both selected by the bank select circuit, a memory address which has the contents of the selected one register bank as lower-order bit contents and the contents of the selected one memory bank select register as higher-order bit contents, and for accessing a memory based on the memory address.

A microcomputer according to an embodiment of the invention includes a control means for validating or invalidating selection of the memory bank select registers.

BRIEF DESCRIPTION OF THE DRAWINGS

The above and other objects, features and advantages of the present invention will be apparent from the following description of preferred embodiments of the invention with reference to the accompanying drawings.

DESCRIPTION OF THE PREFERRED EMBODIMENTS OF THE INVENTION

Similar reference symbols or numerals referring to the same or similar elements in all figures of the drawings are used throughout the description of the invention.

Figure 1:
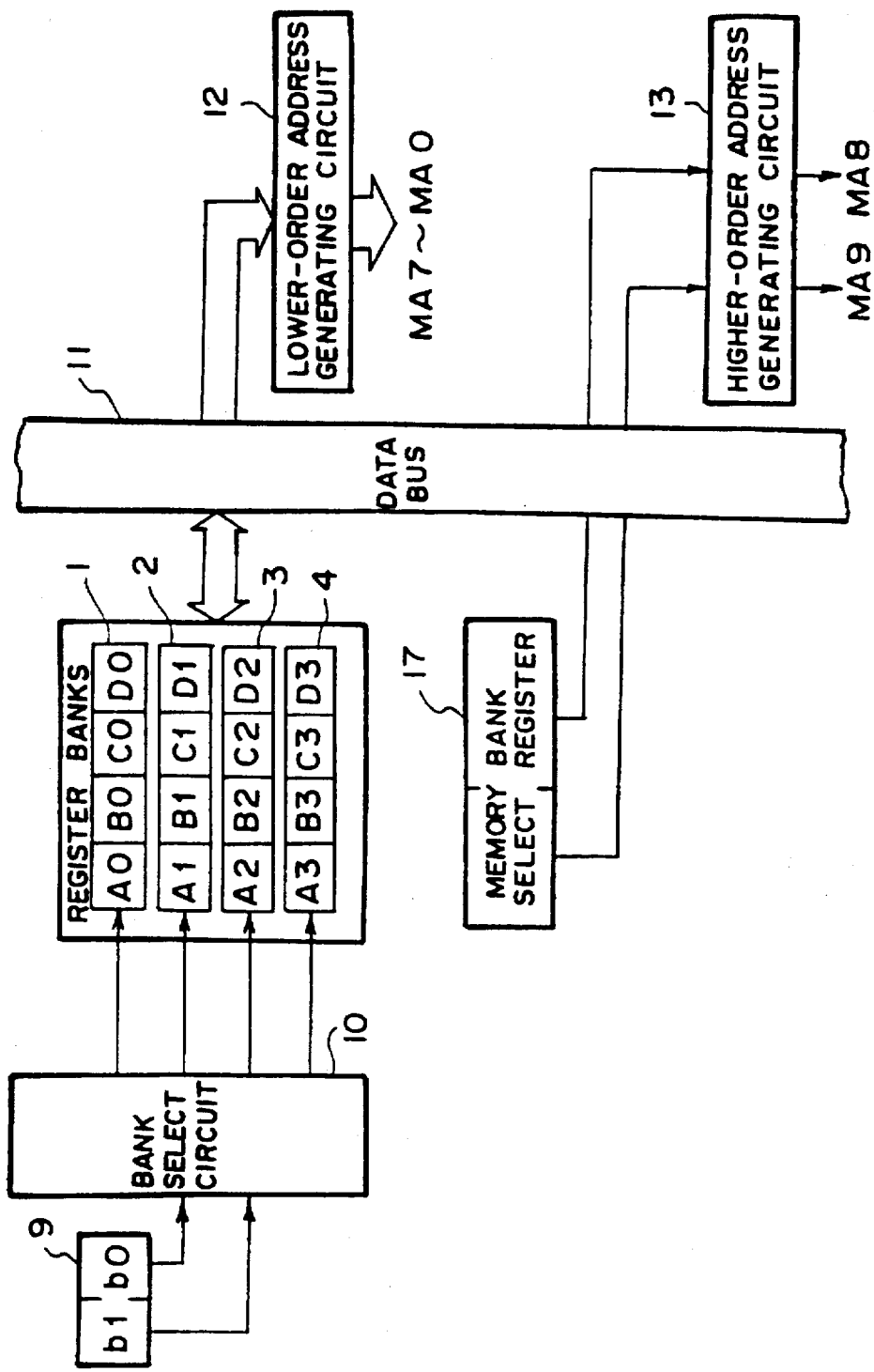
FIG. 1 is a block diagram showing an embodiment of the prior art.
Figure 2:
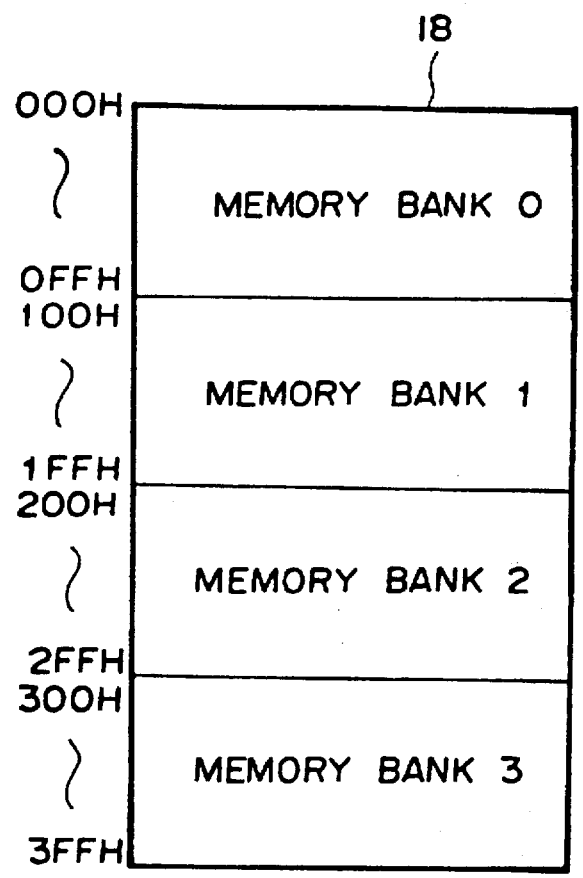
FIG. 2 is a diagram showing a conventional data memory allocation.
Figure 3:
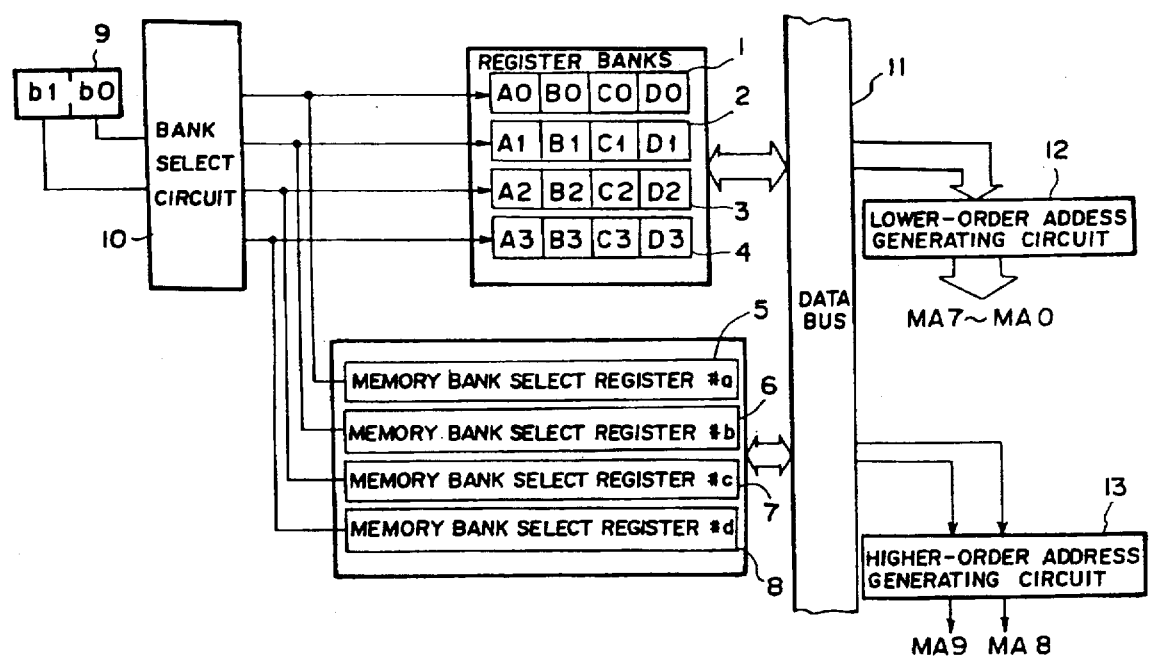
FIG. 3 is a block diagram showing a first embodiment of the present invention.

Referring now to FIG. 3, register bank (#a) 1, register bank (#b) 2, register bank (#c) 3, register bank (#d) 4, bank select circuit 10, data bus 11, lower-order address generating circuit 12, and the central processing unit (not shown) are the same as those in the prior art described above, so that a detailed description thereof is omitted. The data memory allocation is the same as that shown in FIG. 2. The register bank select register 9 is a register which selects a register bank and a memory bank select register to be used and the contents of this register bank select register 9 are decoded in the bank select circuit 10. If the content of the register bank select register 9 is "00", the register bank (#a) 1 and the memory bank select register (#a) 5 are selected, if the content of the register bank select register 9 is "01", the register bank (#b) 2 and the memory bank select register (#b) 6 are selected, if the content of the register bank select register 9 is "10", the register bank (#c) 3 and the memory bank select register (#c) 7 are selected, and if the content of the register bank select register 9 is "11", the register bank (#d) 4 and the memory bank select register (#d) 8 are selected. The higher-order address generating circuit 13 which is coupled to data bus 11, is an address generating circuit which outputs content of a memory bank select register #n (n being a, b, c or d) selected by the register bank select register 9 as higher-order 2-bits MA9 and MA8 of the memory address. The memory bank select register (#a) 5, memory bank select register (#b) 6, memory bank select register (#c) 7, and memory bank select register (#d) 8 are 2-bit registers, respectively, which select one of the memory banks "0" to "3" to be used according to the respective contents thereof.

A method for selecting a memory bank and a register bank when there occurs a request for interruption is as follows. In the initial setting, "00", "11", "10" and "11" are set in the memory bank select register (#a) 5, memory bank select register (#b) 6, the memory bank select register (#c) 7, and memory bank select register (#d) 8, respectively. At first, in the main routine, "00" is set in the register bank select register 9, and processing is performed by specifying the memory bank "0" as an access memory area since the content of the register bank (#a) 1 and the content of the memory bank select register (#a) 5 are "00". For instance, if the data "06H" and "0CH" are set in registers A0 and B0 of register bank (#a) 1, respectively, and an indirect addressing instruction of these registers A0 and B0 is executed, the higher-order address generating circuit 13 outputs MA9, MA8=00, while the lower-order address generating circuit 12 outputs MA7–MA0=01101100, thus enabling access to the memory address "06CH".

Next, a processing when there occurs a request for interruption will be described.

When the processing is branched or switched to an interruption processing routine upon the occurrence of a request for an interruption, the current contents of the register bank select register 9 are stored in the stack area according to the PUSH command. Then, a register bank to be used in the interruption processing routine is selected. Here, "01" is set in the register bank select register 9 and, since the content of the register bank (#b) 2 and the content of the memory bank select register (#b) 6 is "11", processing is performed with the memory bank "3" selected as the access memory area. For instance, if data "06H" and "0CH" are set in registers A1 and B1 of the register bank (#b) 2, respectively, and an indirect addressing instruction of these registers A1 and B1 is executed, the higher-order address generating circuit 13 outputs MA9, MA8=11, while the lower-order address generating circuit 12 outputs MA7–MA0=01101100, thus enabling access to the memory address "36CH". At the end of the interruption processing routine, the information in the register bank to be used in the main routine, which had been stored in the stack area, is restored.

Thus, according to the present invention, as described in connection with the first embodiment shown in FIG. 3, the switching of the information about a register bank to be used and switching of the information about a memory bank to be used can be performed only by changing the contents of the register bank select register 9. Also, if the register bank select register 9 is mapped in a program status word (hereinafter referred to as "PSW") constituted by processor operation status flags, the PSW is automatically saved in the stack area when the processing is branched or switched to an interruption processing subroutine, and a register bank and a memory bank to be used in the interruption processing routine can be selected only by having data set once in the register bank select register 9 when an interruption request occurs. Thus, saving and restoring the information about a register bank and a memory bank to be used in the main routine are no longer necessary.

Figure 4:
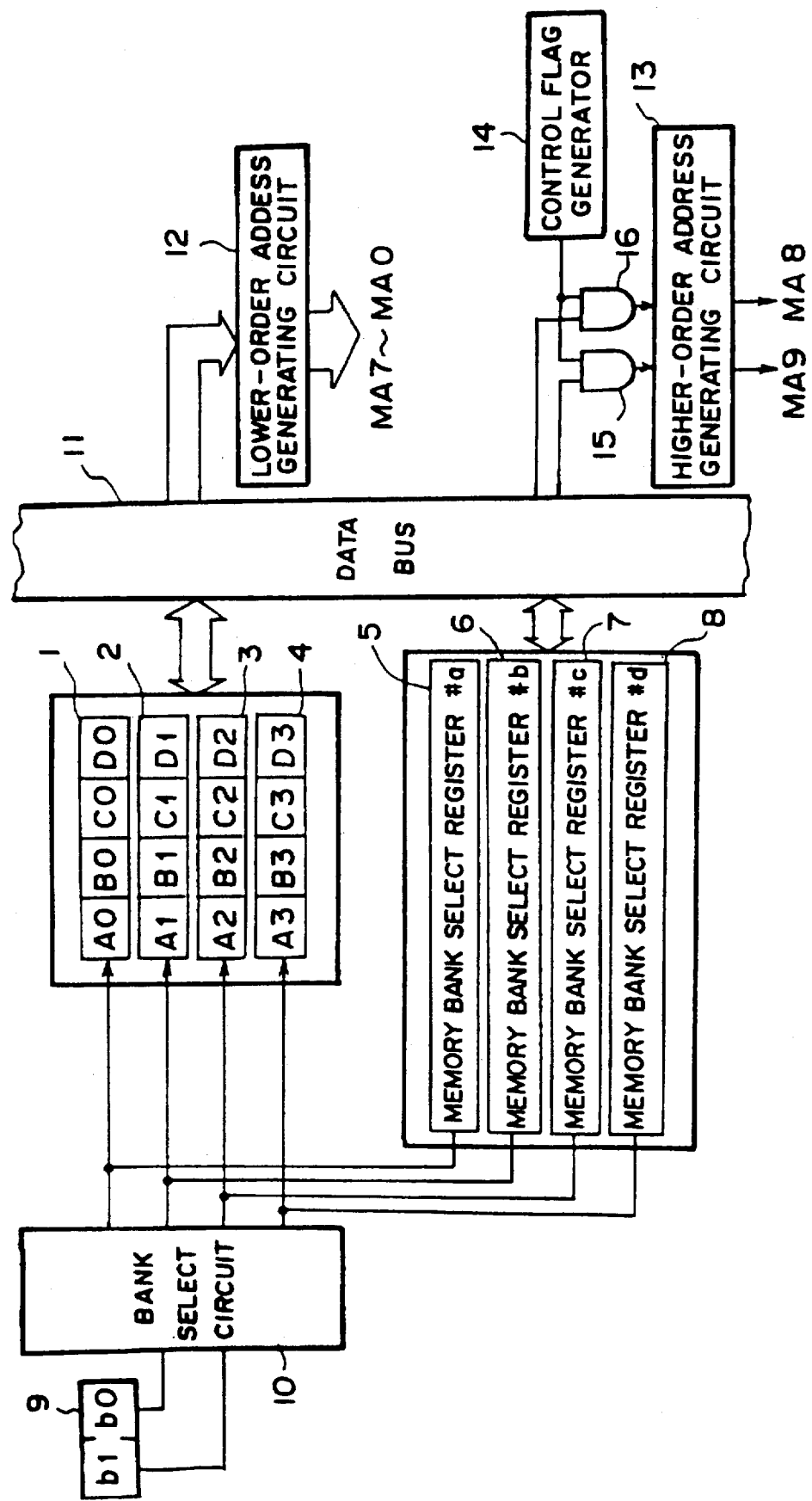
FIG. 4 is a block diagram showing a second embodiment of the present invention.

A second embodiment of the invention is shown in FIG. 4. In the second embodiment, a control flag generator 14 is added to the configuration of the first embodiment. The control flag generator 14 operates to control whether the contents of a memory bank select register selected by the register bank select register 9 are validated or invalidated. Specifically, when the content of the control flag generator 14 is "0", the contents of the selected memory bank select register are invalidated, and the higher-order address generating circuit 13 outputs MA9, MA8=00, and the memory bank "0" is selected. On the other hand, when the content of the control flag generator 14 is "1", the contents of the selected memory bank select register are validated, and the higher-order address generating circuit 13 outputs the contents of the selected memory bank select register.

The operation of the microcomputer of the second embodiment is as follows. The description is premised on the execution of a processing routine to make comparison between the contents at a specific address in the memory bank "3" and the contents at a specific address in the memory bank "0". In the initial setting, data "00", "11", "10" and "11" are set in the memory bank select register (#a) 5, memory bank select register (#b) 6, memory bank select register (#c) 7, and memory bank select register (#d) 8, respectively. In the main routine, "01" is set in the register bank select register 9, and processing is performed by selecting the memory bank "3" as the access memory area since the contents of register bank (#b) 2 and memory bank select register (#b) 6 are "11". For instance, if data "06H" and "0CH" are set in registers A1 and B1 of register bank (#b) 2, respectively, and an indirect addressing instruction of these registers A1 and B1 is executed, the higher-order address generating circuit 13 outputs MA9, MA8=11, while the lower-order address generating circuit 12 outputs MA7–MA0=01101100, thus enabling access to the memory address "36CH". If control flag generator 14 is cleared to "0" and an indirect addressing instruction of two registers A1 and B1 is executed, the higher-order address generating circuit 13 outputs MA9, MA8=00, while the lower-order address generating circuit 12 outputs MA7–MA0= 01101100, thus enabling access to the memory address "06CH". In brief, switching between a memory bank #n (n being 1, 2 or 3) specified by the register bank select register 9 and the memory bank "0" can be conducted only by the operation of the control flag generator 14.

In the second embodiment, AND gates 15, 16 are used between the control flag generator 14 and the higher-order address generating circuit. AND gates 15 and 16 are also connected to data bus 11. The circuit accesses the memory bank "0" when the control flag generator 14 is set to "0". However, if NAND gates were used instead of the AND gates 15, 16, the circuit would be able to access the memory bank "3".

As the first and second embodiments assume each a 4-bit microcomputer as an example, each of the registers has a 4-bit configuration. However, in the case of an 8-bit microcomputer, each of the registers will have an 8-bit configuration. In this case, the range of indirect addressing by a register pair expands from a range of 256 addresses, or address 00 to address FF, to a range of 65536 addresses, or address 0000 to address FFFF. For this reason, a memory capacity of one bank can be expanded up to 65536×8-bits. Also, when the register bank select register and the memory bank select register have a 2-bit configuration, the number of banks which can be selected is 4, respectively. However, if a 3-bit configuration or a 4-bit configuration is employed, the number of banks, which can be selected, can be expanded to 8 banks and 16 banks, respectively. It should be noted that a bit configuration of the register bank select register may not be the same as that of the memory bank select register.

As described above, a microcomputer according to the present invention has the same number of the memory bank select registers as that of register banks. Since the memory banks can be switched only by switching of the register banks, when an interruption request has occurred, or when a call instruction is executed, the operations required only include saving of current contents of the register bank select register, setting the register bank select register to be used in a subroutine, and restoring the register bank register to be used in the main routine. As a result, the number of program steps can be reduced, and when the operation is repeated a number of times in a wide range of addresses, the data processing time can be reduced by the memory bank switching operation. Further, if the register bank select register is mapped in the PSW, when a call instruction is executed, or when an interruption request occurs, saving and restoring of the contents of the register bank to be used in the main routine are executed automatically, so that only setting of a register bank used in the subroutine is required. Also, since a memory bank corresponding to one register bank can be freely set, a memory which is accessible for a branching or switching process can be freely allocated.

While the invention has been described in its preferred embodiments, it is to be understood that the description should not be perceived as limitation and that changes within the purview of the appended claims may be made without departing from the true scope and spirit of the invention in its broader aspects.

What is claimed is:

1. A microcomputer comprising:

a plurality of register banks each having a plurality of addressing registers;

a plurality of memory bank select registers which are same as said plurality of register banks in number;

a register bank select register for temporarily storing memory bank selection information;

a bank select circuit for decoding said memory bank selection information stored in said register bank select register and for selecting both one of said plurality of register banks and one of said plurality of memory bank select registers; and an address generating circuit for generating, based on contents of said selected one register bank and said selected one memory bank select register, a memory address which has the contents of said selected one register bank as lower-order bit contents and the contents of said selected one memory bank select register as higher-order bit contents, and for accessing a memory based on said memory address, said address generating circuit being such that one of the plurality of addressing registers included in the register bank selected is made a lower bit of the memory address.

2. The microcomputer according to claim 1, further comprising a control means connected to said address generating circuit, for validating or invalidating the contents of said selected one memory bank select register.

3. The microcomputer according to claim 2, wherein said control means includes:

a control flag generator for issuing a control flag; and a plurality of AND gates coupled to said control flag generator and each receiving said control flag and the contents of said selected one memory bank select register.

4. The microcomputer according to claim 1 wherein said address generating circuit is such that one of the plurality of addressing registers contained in the register bank selected, which is specified by an addressing instruction, is made a lower bit of the memory address.

5. A microcomputer comprising:

a plurality of register banks each having a plurality of addressing registers;

a plurality of memory bank select registers which are same as said plurality of said register banks in number;

a register bank select register for temporarily storing memory bank selection information;

a bank select circuit for decoding said memory bank selection information stored in said register bank select register and for selecting both one of said plurality of register banks and one of said plurality of memory bank select registers; and an address generating circuit for generating, based on contents of said selected one register bank and said selected one memory bank select register, a memory address which has the contents of said selected one register bank as lower-order bit contents and the contents of said selected one memory bank select register as higher-order bit contents, and for accessing a memory based on said memory address, said address generating circuit being such that one of the plurality of addressing registers included in the register bank selected is made a lower bit of the memory address, wherein said memory bank selection information in said register bank select register is only saved when an interruption request is issued and, thereafter, new memory bank selection information is rewritten in said register bank select register, and said bank select circuit responds to said new memory bank selection information and selects both another one of said plurality of register banks and another one of said plurality of memory bank select registers.

6. The microcomputer according to claim 5, further comprising a control means connected to said address generating circuit, for validating or invalidating the contents of said selected one memory bank select register.

7. The microcomputer according to claim 6, wherein said control means includes:

a control flag generator for issuing a control flag; and a plurality of AND gates coupled to said control flag generator and each for receiving said control flag and the contents of said selected one memory bank select register.

8. The microcomputer according to claim 5, wherein said address generating circuit is such that one of the plurality of addressing registers contained in the register bank selected, which is specified by an addressing instruction, is made a lower bit of the memory address.

* * * * *